United States Patent [19]

Fujii et al.

[11] Patent Number: 5,467,348
[45] Date of Patent: Nov. 14, 1995

[54] BANDWIDTH ALLOCATION SYSTEM OF VIRTUAL PATH IN ASYNCHRONOUS TRANSFER MODE

[75] Inventors: Shigeo Fujii; Masayuki Kuga, both of Tokyo, Japan

[73] Assignee: NEC Corporation, Tokyo, Japan

[21] Appl. No.: 177,984

[22] Filed: Jan. 6, 1994

[30] Foreign Application Priority Data

Jan. 11, 1993 [JP] Japan ................................. 5-002281

[51] Int. Cl.$^6$ ........................................... H04J 3/17
[52] U.S. Cl. ....................... 370/60.1; 370/95.1; 370/118
[58] Field of Search ................................. 370/58.1, 58.2, 370/58.3, 60, 60.1, 61, 62, 94.1, 95.1, 118

[56] References Cited

U.S. PATENT DOCUMENTS

| | | | |
|---|---|---|---|
| 5,070,498 | 12/1991 | Kakuma et al. | 370/60 |
| 5,274,643 | 12/1993 | Fisk | 370/94.1 |
| 5,280,483 | 1/1994 | Kamoi et al. | 370/60 |

OTHER PUBLICATIONS

Hisaya Hadama and Ken–ichi Sato, "Dynamic Virtual path Bandwidth Control Effects in ATM Networks", The Institute of Electronics, Information and Communication Engineers, Communication Technical Report, SSE 90–46, pp. 49–54, Jul. 1990.

Tutomu Murase et al., "A Call Admission Control for ATM Networks Based on Individual Multiplexed Traffic Characteristics", The Institute of Electronics, Information and Communication Engineers, Communication Technical Report, SSE 90–46, pp. 55–60, Jul. 1990.

Primary Examiner—Douglas W. Olms
Assistant Examiner—Ricky Q. Ngo
Attorney, Agent, or Firm—Foley & Lardner

[57] ABSTRACT

A bandwidth allocation system of a virtual path in an asynchronous transfer mode includes a virtual path setting unit, a bandwidth allocating unit, an attribute assigning unit, a group bandwidth allocating unit, and a cell output unit. The virtual path setting unit sets a plurality of virtual paths in a repeating line of an asynchronous transfer mode communication scheme, each of the virtual paths being a direct link which logically determines a route and a bandwidth in an asynchronous transfer mode switching network. The bandwidth allocating unit allocates a bandwidth for each virtual path. The attribute assigning unit assigns attributes classified in accordance with a communication quality to a plurality of virtual path groups obtained by bundling the virtual paths. The group bandwidth allocating unit proportionally distributes bandwidths to the virtual path groups in accordance with a sum total of the bandwidths allocated to the virtual paths constituting the virtual path groups and sets a virtual path network. The cell output unit outputs a cell of terminal information to the repeating line in accordance with the attributes assigned to the virtual path groups.

10 Claims, 5 Drawing Sheets

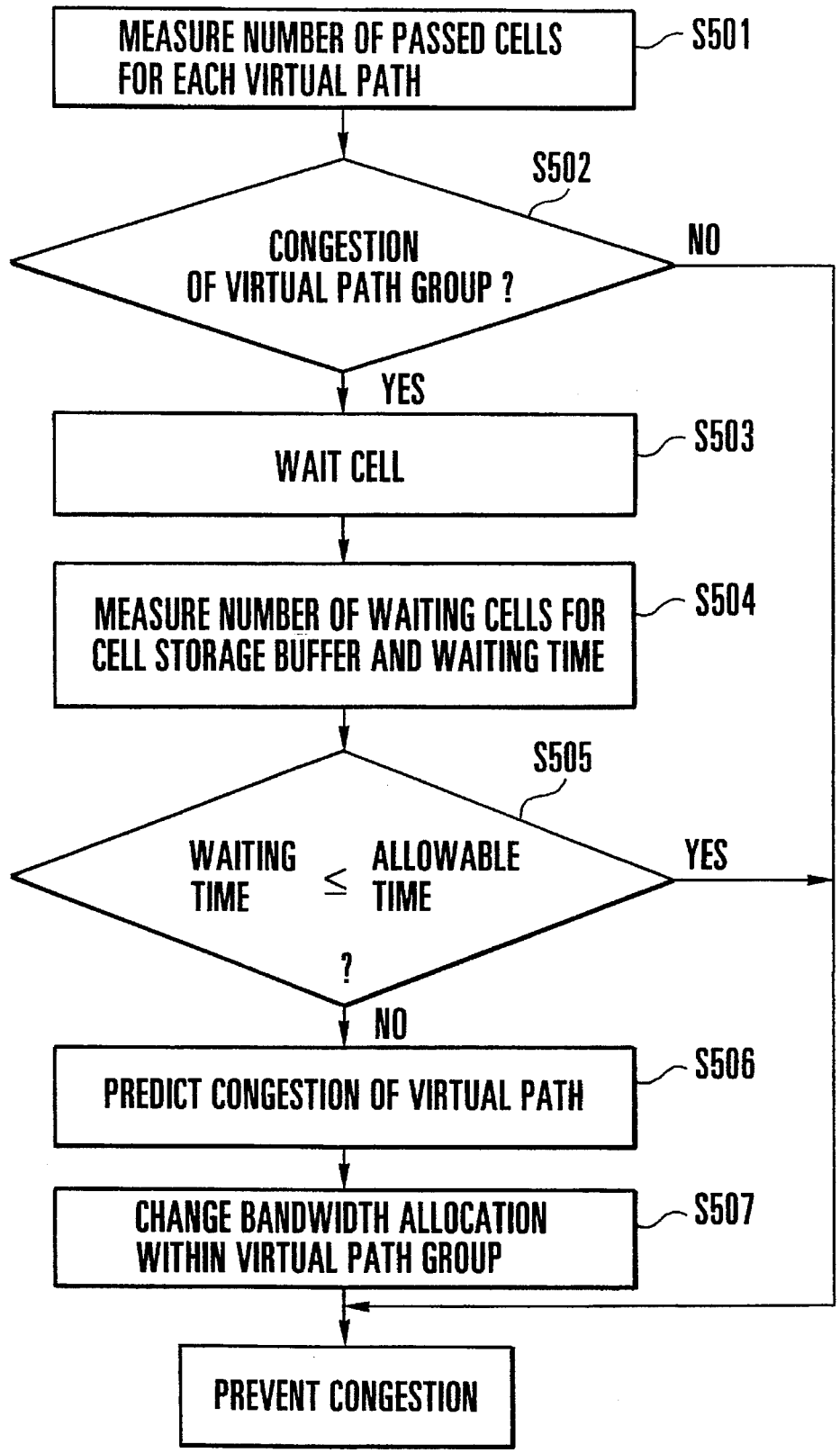
F I G. 5

BANDWIDTH ALLOCATION SYSTEM OF VIRTUAL PATH IN ASYNCHRONOUS TRANSFER MODE

BACKGROUND OF THE INVENTION

The present invention relates to a bandwidth allocation system of a virtual path in an asynchronous transfer mode.

A conventional asynchronous transfer mode (ATM) coding system has time variations in amount of coding information, and pieces of information are multiplexed to efficiently utilize network resources.

Cell losses probabilistically occur during waiting for statistical multiplexing in a network, and therefore quality of communications is degraded.

In an ATM network, a virtual path arranged in a repeating line of an ATM communication scheme is not related to call generation, and the transmission capacity of the virtual path is determined in network design. In addition, whether a call is permitted or not is determined such that the bandwidth of a call is calculated on the basis of a traffic report value from a user upon generation of the call and compared with the empty capacity of the virtual path.

The virtual path is defined as a direct link which logically determines a route and a bandwidth in an arbitrary ATM switching network in a physical transmission network.

To assure the quality of the permitted call, cells in number larger than the report value of the user are monitored not to enter into the network in accordance with a policy control function. Priority control of transfer processes is performed in accordance with the attributes of terminals and media characteristics of communication information. A currently connected call is detoured to a new virtual path, thereby performing quality control.

In this conventional ATM communication scheme, the transmission capacity of a plurality of virtual paths arranged in the ATM communication network is permanently determined, the bandwidth utilization for each virtual path is not constant, and the repeating line cannot be efficiently utilized.

When the transmission capacity of the virtual paths is set in consideration of a statistical multiplex effect and cells are output in number larger than a preset number, adverse influences of quality degradation such as cell losses are imposed on the entire repeating line.

SUMMARY OF THE INVENTION

It is an object of the present invention to provide a bandwidth allocation system of a virtual path in an asynchronous transfer mode, which can average bandwidth utilization for each virtual path and effectively utilize a repeating line.

It is another object of the present invention to provide a bandwidth allocation system of a virtual path in an asynchronous transfer mode, which can prevent congestion of a repeating line and improve communication quality.

In order to achieve the above objects of the present invention, there is provided a bandwidth allocation system of a virtual path in an asynchronous transfer mode, comprising virtual path setting means for setting a plurality of virtual paths in a repeating line of an asynchronous transfer mode communication scheme, each of the virtual paths being a direct link which logically determines a route and a bandwidth in an asynchronous transfer mode switching network, bandwidth allocating means for allocating a bandwidth for each virtual path, attribute assigning means for assigning attributes classified in accordance with a communication quality to a plurality of virtual path groups obtained by bundling the virtual paths, group bandwidth allocating means for proportionally distributing bandwidths to the virtual path groups in accordance with a sum total of the bandwidths allocated to the virtual paths constituting the virtual path groups and setting a virtual path network, and cell output means for outputting a cell of terminal information to the repeating line in accordance with the attributes assigned to the virtual path groups.

BRIEF DESCRIPTION OF THE DRAWINGS

FIG. 5 is a flow chart showing a flow of a change in bandwidth allocation upon occurrence of congestion in a virtual path group in FIG. 1.

DESCRIPTION OF THE PREFERRED EMBODIMENT

Figure 1:
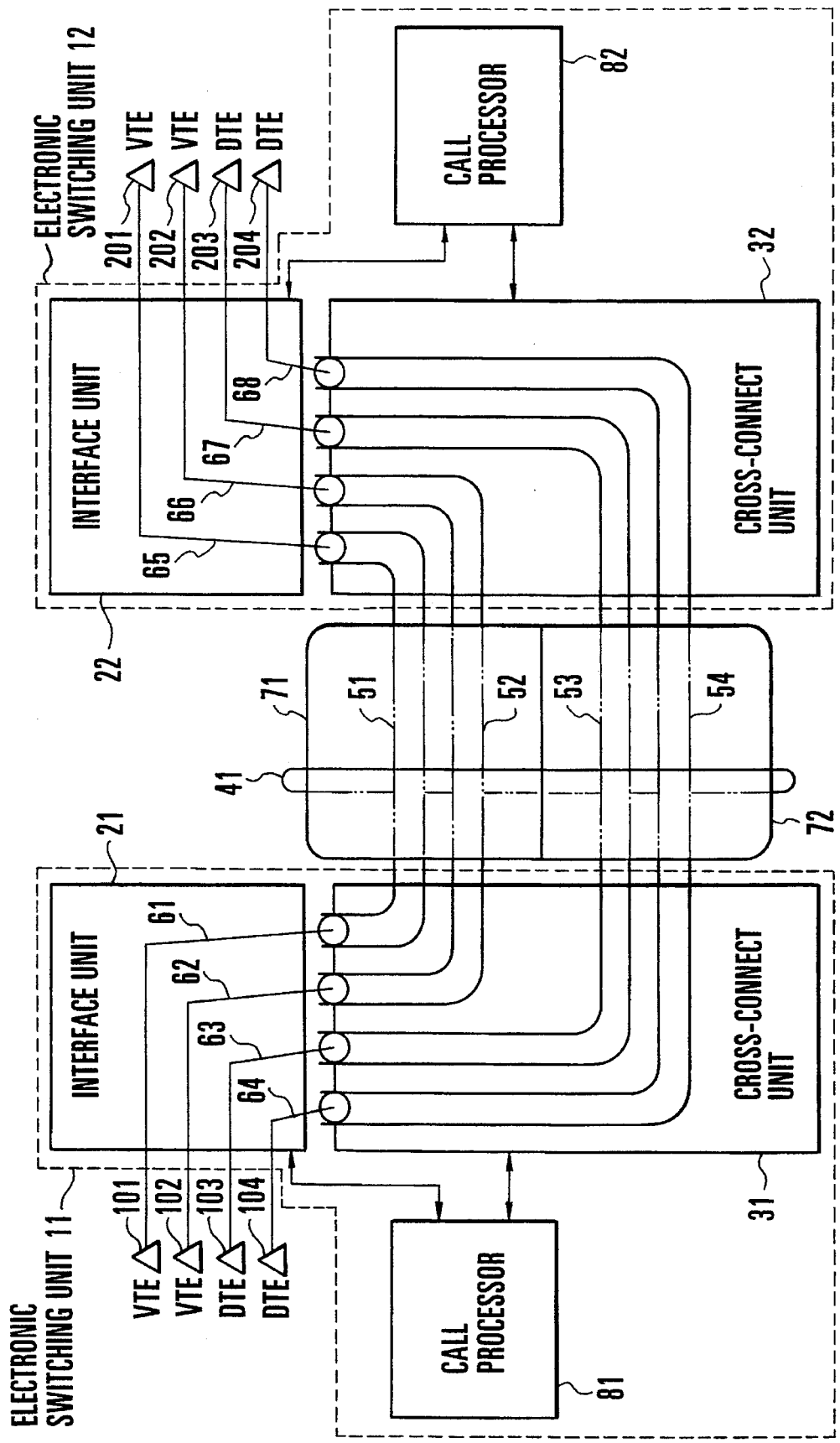
FIG. 1 is a system block diagram showing connections between electronic switching units which exemplify a bandwidth allocation system of a virtual path in an asynchronous transfer mode according to an embodiment of the present invention.
Figure 2:
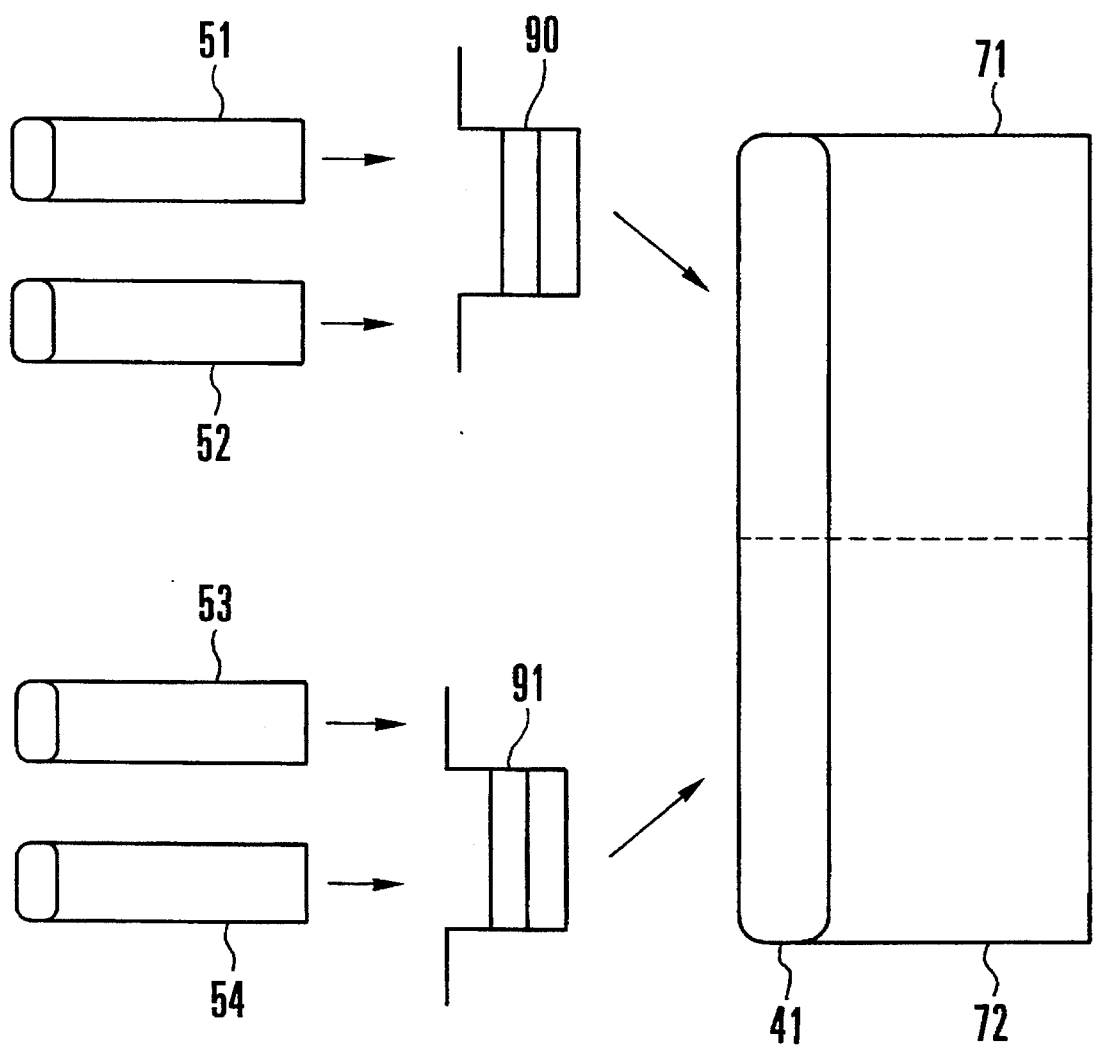
FIG. 2 is a view for explaining a process performed when congestion has occurred in a virtual path group.
Figure 3:
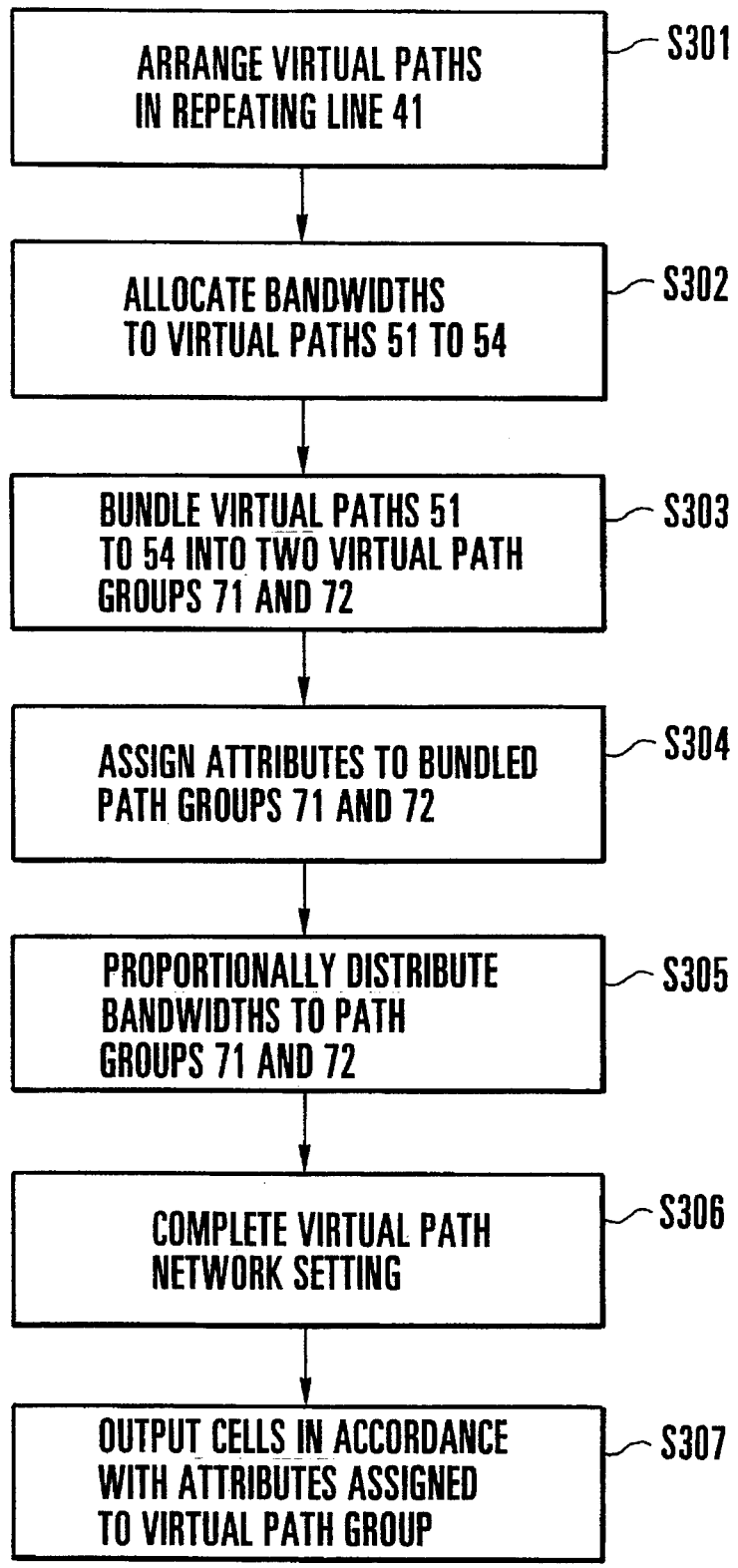
FIG. 3 is a flow chart showing a flow from virtual path setting to virtual path network setting in a call processor in FIG. 1.
Figure 4:
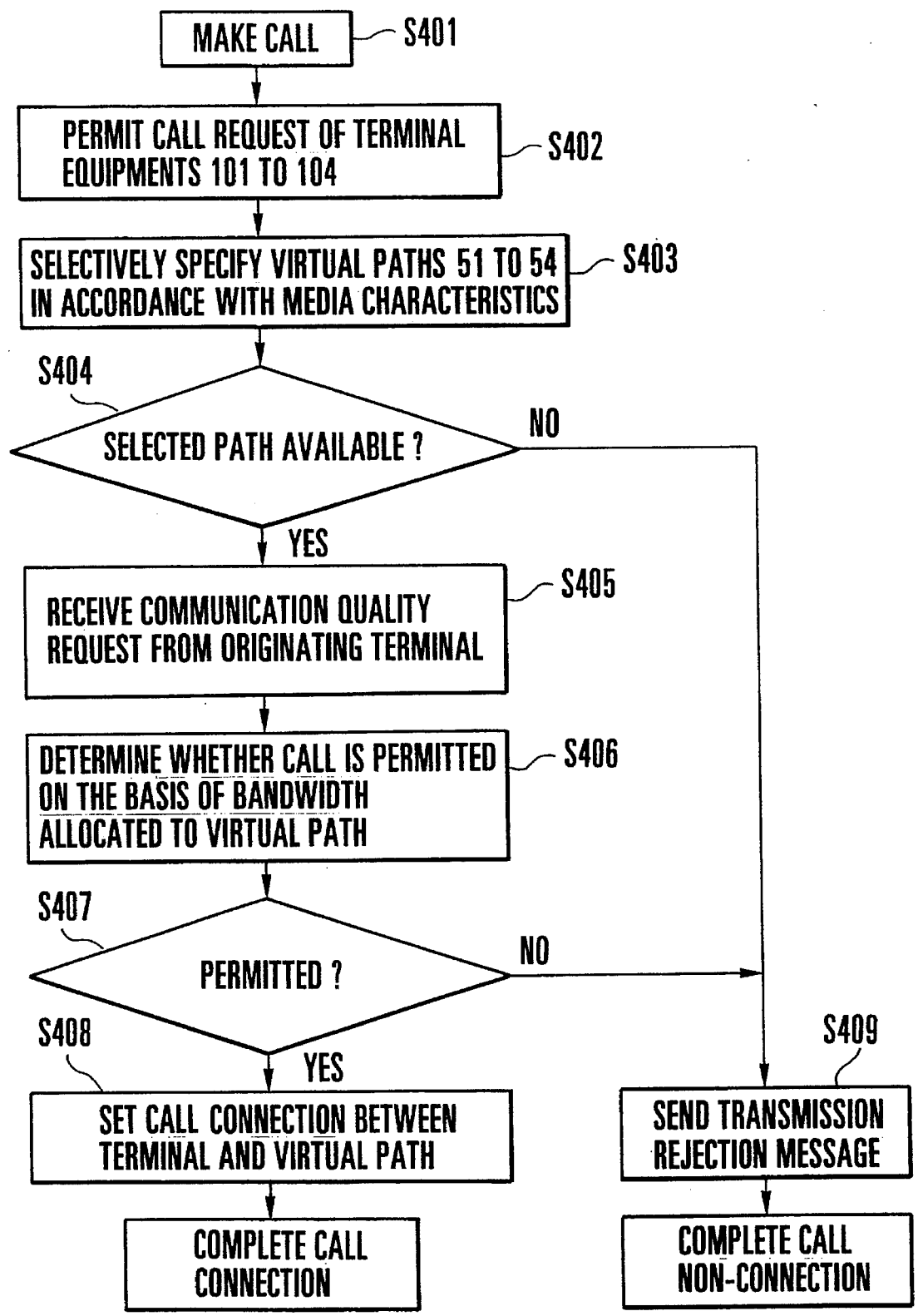
FIG. 4 is a flow chart showing a flow from a call to a call connection between a terminal and a virtual path in FIG. 1.

The present invention will be described with reference to the accompanying drawings. FIG. 1 shows connections between electronic switching units, which exemplifies a bandwidth allocation system of a virtual path in an asynchronous transfer mode according to an embodiment of the present invention, FIG. 2 shows a process performed when congestion has occurred in virtual paths in FIG. 1, and FIGS. 3, 4, and 5 show process sequences in FIG. 1, in which FIG. 3 shows a flow from virtual path setting to virtual path network setting, FIG. 4 shows a flow from a call to a call connection between a terminal and a virtual path, and FIG. 5 shows a flow a change in bandwidth allocation upon congestion between the virtual paths.

In the system of this embodiment, as shown in FIG. 1, electronic switching units 11 and 12 of an ATM communication scheme are connected to each other through a repeating line 41 of the ATM communication scheme. Assume that the electronic switching unit 11 serves as an originating unit and that the electronic switching unit 12 serves as a terminating unit. The electronic switching unit 11 comprises an interface unit 21 which accommodates voice terminal equipments (to be referred to as VTEs hereinafter) 101 and 102 and data terminal equipments (to be referred to as DTEs hereinafter) 103 and 104, a cross-connect unit 31 for connecting calls 61 to 64 from the VTEs 101 and 102 and the DTEs 103 and 104 to virtual paths 51 to 54 of the repeating line 41, and a call processor 81 for controlling the interface unit 21 and the cross-connect unit 31 to perform a call process. Similarly, the electronic switching unit 12 comprises an interface unit 22 for accommodating VTEs 201 and 202 and DTEs 203 and 204, a cross-connect unit 32 for connecting calls 65 to 68 from virtual paths 51 to 54 to the VTEs 201 and 202 and the DTEs 203 and 204, and a call processor 82 for controlling the interface unit 22 and the cross-connect unit 32 to perform a call process. The repeating line 41 for connecting the electronic switching units 11 and 12 is set such that the virtual paths 51 and 52 are bundled into a virtual path group 71 and the virtual paths 53 and 54 are bundled into a virtual path group 72.

The interface units 21 and 22 in the exchange units 11 and 12 organize voice/data information from the VTEs 101 and 102 and the DTEs 103 and 104, and the VTEs 201 and 202 and the DTEs 203 and 204 into cells and restore the voice/data information cells. The cross-connect units 31 and 32 set and change the virtual paths 51 to 54 under the control of the call processors 81 and 82. At the same time, the cross-connect units 31 and 32 connect the calls 61 to 64 and the calls 65 to 64 to the virtual paths 51 to 54 of the repeating line 41. The call processors 81 and 82 comprise, e.g., store-and-program central processing units and perform virtual path network setting and call process control shown in FIGS. 3 to 5.

Operations of the bandwidth allocation system of a virtual path in the asynchronous transfer mode having the above arrangement will be described with reference to flow charts in FIGS. 3 to 5. As shown in FIG. 3, the cross-connect unit 31 in the electronic switching unit 11 sets the virtual paths 51, 52, 53, and 4 under the control of the call processor 81 (step S301).

The virtual paths 51, 52, 53, and 54 perform bandwidth allocation for each virtual path (step S302) to bundle the virtual paths 51 and 52 into the virtual path group 71 and the virtual paths 53 and 54 into the virtual path group 72, thereby providing attributes classified by communication qualities defined by cell delay times and cell loss rates (step S304). More specifically, the originating terminals are classified into voice, image, and data terminal equipments. For example, voice information from the voice terminal equipment becomes an echo to result in a small allowance in cell delay time. However, the voice information has a high redundancy level to result in a high allowance in cell loss rate. The data information from the data terminal equipment has a high allowance in cell delay time, but no allowance in cell loss rate. The image terminal equipment has a predetermined allowance in cell delay time and a predetermined allowance in cell loss rate. Therefore, the attributes must be classified in accordance with communication qualities having different cell delay times and different cell loss rates depending on various kinds of information so as to allocate a virtual path group for each information. The classified attributes are assigned to the virtual paths.

The bandwidths are proportionally allocated to the virtual path groups 71 and 72 on the repeating line 41 in accordance with the sum total of the bandwidths allocated to the virtual paths 51 to 54 of the two virtual path groups 71 and 72 set in the repeating line 41 (step S305). When the virtual path network is completely set (step S306), cells are output in accordance with the attributes assigned to the virtual path groups 71 and 72 (step S307).

On the other hand, when a call is generated, as shown in FIG. 4 (step S401), the call processor 81 in the electronic switching unit 11 permits a call request from an originating terminal (VTEs 101 and 102 and DTEs 103 and 104) (step S402) and selectively specifies the virtual paths 51 to 54 of the virtual path groups 71 and 72 assigned with the attributes in accordance with the attributes of the originating terminal and the media characteristics of the communication information (step S403), thereby determining the presence/absence of the selected virtual path (step S404). More specifically, the virtual path group 71 or 72 assigned with the corresponding attributes in accordance with the type of terminal equipment or information is automatically specified, and one of the virtual paths 51 and 52 or 53 and 54 of the designated one of the virtual path groups 71 and 72 is selected as a communication channel.

If the selected virtual path is available in step S404, the communication quality request according to the media characteristics of the communication information and individual specifications is received from the originating terminal (step S405). The call processor 81 determines whether the call is permitted on the basis of the bandwidth assigned to the selected one of the virtual paths 51 to 54 and the requested communication quality (step S407).

If YES in step S407, for example, calls 61, 65, 62, 66, 63, 67, 64, and 68 are set between the VTE 101 and the virtual path 51 in FIG. 1, between the VTE 201 and the virtual path 51, between the VTE 102 and the virtual path 52, between the VTE 202 and the virtual path 52, between the DTE 103 and the virtual path 53, between the DTE 203 and the virtual path 53, between the DTE 104 and the virtual path 54, and between the DTE 204 and the virtual path 54, respectively (step S408) in accordance with a known call connection technique.

As shown in the flow chart in FIG. 4, the VTE 101, the VTE 102, the DTE 103, and the DTE 104 are connected to the VTE 201, the VTE 202, the DTE 203, and the DTE 204, respectively, and the cells are output in accordance with the attributes assigned to the virtual path groups 71 and 72.

On the other hand, if NO in steps S404 and S407, a transmission rejection message is sent to the originating terminal in accordance with a known technique (step S409), and a call connection is not performed.

In the system shown in FIG. 2, cell storage buffers 90 and 91 for storing cells are arranged between the virtual path group 71 and the virtual paths 51 and 52, and between the virtual path group 72 and the virtual paths 53 and 54, respectively, as shown in FIG. 2. By providing this cell storage function, even if the number of output cells exceeds the capacity of the selected transmission channel, temporary waiting is performed to prevent cell losses. However, if a time during which the number of input cells exceeds the capacity of the transmission channel is long, the cell storage buffers become full, and the cells must be lost.

A process for preventing cell losses and changing a virtual path bandwidth in accordance with prediction of virtual path congestion will be described with reference to FIGS. 1, 2, and 5.

The call processors 81 and 82 in the electronic switching units 11 and 12 monitor the numbers of cells passing through each one of the virtual paths 51, 52, 53, and 54 to obtain communication transmission amounts (step S501) to determine whether congestion has occurred in the virtual path groups 71 and 72 (step S502).

When it is determined in step S502 whether congestion has occurred in the virtual path groups 71 and 72, waiting for storing the cells in the cell storage buffers 90 and 91 is performed (step S503), and cell waiting times are calculated in accordance with the numbers of cells input to the cell storage buffers 90 and 91 per unit time and the channel rates of output cells (step S504).

It is determined in step S505 whether the waiting time falls within an allowable time in accordance with the capacities of the virtual paths 51 to 54 and a rate of increase in waiting time per unit time. If NO in step S505, i.e., if it is determined in step S505 that the numbers of cells in the cell storage buffers 90 and 91 and the waiting times exceed the allowable values, congestion of the virtual paths 51 to 54 is predicted (step S506) to monitor the cells in the cell storage buffers 90 and 91. A cell loss rate predicted from the rate of change of the unit waiting time in the virtual path 51, 52, 53, or 54 which has been predicted to be congested, is obtained. To assure the output range of cells whose losses are predicted, the bandwidth of a virtual path having a minimum number of cells received per unit time in each of the cell storage buffers 90 and 91 is reduced, and the bandwidth of the virtual path whose congestion has been predicted is increased to change the bandwidth allocation in the virtual path groups 71 and 72 (step S507), thereby preventing congestion of the virtual path groups 71 and 72.

That is, the call processors 81 and 82 manage the bandwidths of the repeating line 41 using service quality as a parameter for each of the VETs 101 and 102 and the VTEs 103 and 104. When the delay times of the virtual paths 51 to 54 come close to the allowable time limit, the bandwidths of the virtual paths 51 to 54 are changed in accordance with the priority levels for each service quality.

When congestion of any virtual path is not detected in step S502, i.e., if it is determined that the normal operation is performed, and when the waiting time is determined in step S506 to fall within the allowable time, changes in bandwidth allocation of the virtual path groups 71 and 72 are not performed.

As has been described above, according to the present invention, a plurality of virtual paths are arranged in a repeating line of an asynchronous transfer mode communication scheme, and the plurality of virtual paths are bundled into two groups. Attributes classified in accordance with communication qualities are assigned to these virtual path groups. When congestion of a virtual path is predicted, the bandwidth allocation of this virtual path in the virtual path group is changed to allow bandwidth allocation in which the sum total of the bandwidth of the virtual paths can exceed the transmission bandwidth of the repeating line. At the same time, congestion of the repeating line can be prevented.

What is claimed is:

1. A bandwidth allocation system of a virtual path in an asynchronous transfer mode, comprising:

virtual path setting means for setting a plurality of virtual paths in a repeating line by which cross-connect units in an asynchronous transfer mode switching network are connected to each other, each of said virtual paths being a direct link in which a route and a bandwidth between said cross-connect units are logically determined;

bandwidth allocating means for allocating a bandwidth for each virtual path and bundling said plurality of said virtual paths into a plurality of virtual path groups;

attribute classifying means for defining attribute classifications respectively corresponding to a communication quality type;

attribute assigning means for assigning said attribute classifications to said plurality of virtual path groups;

group bandwidth allocating means for proportionally distributing bandwidths to each of said virtual path groups in accordance with a sum total of all bandwidths allocated to said virtual paths constituting said each of said virtual path groups and setting a virtual path network; and cell output means for outputting a cell of terminal information to said repeating line in accordance with the attribute classifications assigned to said virtual path groups.

2. A system according to claim 1, wherein the attribute classifications assigned to said virtual path groups are based on a cell delay time and a cell loss rate.

3. A system according to claim 1, further comprising:

virtual path selecting means for selecting a virtual path in accordance with at least one of an attribute classification of an originating terminal and media characteristics of communication information upon generation of a call;

call permission determining means for determining whether a generated call is permitted in accordance with a bandwidth assigned to the selected virtual path and a communication quality type requested from said originating terminal; and call connection setting means for setting a call connection between said originating terminal and said selected virtual path when the permission of the call is determined.

4. A system according to claim 3, wherein said virtual path selecting means selects one of said virtual paths of said virtual path groups to which an attribute classification corresponding to one of the attribute classifications of said originating terminal and the media characteristics of the communication information is assigned.

5. A system according to claim 1, further comprising communication amount monitoring means for monitoring a transmission amount of the communication information for each virtual path, cell waiting means for temporarily waiting a cell when said communication amount monitoring means determines that a virtual path is busy, congestion predicting means for predicting congestion of a virtual path which is determined to be busy in accordance with a delay time of a waiting cell, and bandwidth allocation changing means for changing bandwidth allocation of the busy virtual path in a virtual path group including the busy virtual path obtained upon prediction of congestion.

6. A system according to claim 5, wherein said bandwidth allocation changing means obtains a cell loss rate in the virtual path, whose congestion is predicted, so as to assure an output bandwidth of a cell whose loss is predicted, decreases a bandwidth of a virtual path having a smaller number of input cells per unit time on the basis of the obtained cell loss rate, and increases a bandwidth of the virtual path whose congestion is predicted.

7. A system according to claim 5, wherein said cell waiting means includes a cell storage buffer arranged between said virtual path group and a virtual path in said virtual path group.

8. A bandwidth allocation system of a virtual path in an asynchronous transfer mode, comprising:

virtual path setting means for setting a plurality of virtual paths in a repeating line by which cross-connect units in an asynchronous transfer mode switching network are connected to each other each of said virtual paths being a direct link in which a route and a bandwidth between said cross-connect units are logically determined;

bandwidth allocating means for allocating a bandwidth for each virtual path and bundling said plurality of said virtual paths into a plurality of virtual path groups;

attribute classifying means for defining attribute classifications respectively corresponding to a communication quality type;

attribute assigning means for assigning said attribute classifications to said plurality of virtual path groups;

group bandwidth allocating means for proportionally distributing bandwidths to each of said virtual path groups in accordance with a sum total of all bandwidths allocated to said virtual paths constituting said each of said virtual path groups and setting a virtual path network;

cell output means for outputting a cell of terminal information to said repeating line in accordance with the attribute classifications assigned to said virtual path groups;

virtual path selecting means for selecting a virtual path in accordance with at least one of an attribute classification of an originating terminal and media characteristics of communication information upon generation of a call;

call permission determining means for determining whether a generated call is permitted in accordance with a bandwidth assigned to the selected virtual path and a communication quality type requested from said originating terminal; and call connection setting means for setting a call connection between said originating terminal and said selected virtual path when the permission of the call is determined, wherein the attribute classifications assigned to said virtual path groups are based on a cell delay time and a cell loss rate, and wherein said virtual path selecting means selects one of said virtual paths of said virtual path groups to which an attribute classification corresponding to one of the attribute classifications of said originating terminal and the media characteristics of the communication information is assigned.

9. A bandwidth allocation system of a virtual path in an asynchronous transfer mode, comprising:

virtual path setting means for setting a plurality of virtual paths in a repeating line by which cross-connect units in an asynchronous transfer mode switching network are connected to each other, each of said virtual paths being a direct link in which a route and a bandwidth between said cross-connect units are logically determined;

bandwidth allocating means for allocating a bandwidth for each virtual path and bundling said plurality of said virtual paths into a plurality of virtual path groups;

attribute classifying means for defining attribute classifications respectively corresponding to a communication quality type;

attribute assigning means for assigning said attribute classifications to said plurality of virtual path groups;

group bandwidth allocating means for proportionally distributing bandwidths to each of said virtual path groups in accordance with a sum total of all bandwidths allocated to said virtual paths constituting said each of said virtual path groups and setting a virtual path network;

cell output means for outputting a cell of terminal information to said repeating line in accordance with the attribute classifications assigned to said virtual path groups;

communication amount monitoring means for monitoring a transmission amount of communication information for each virtual path;

cell waiting means for temporarily waiting a cell when said communication amount monitoring means determines that a virtual path is busy;

congestion predicting means for predicting congestion of a virtual path which is determined to be busy in accordance with a delay time of a waiting cell; and bandwidth allocation changing means for changing bandwidth allocation of the busy virtual path in a virtual path group including the busy virtual path obtained upon prediction of congestion, wherein said bandwidth allocation changing means obtains a cell loss rate in the virtual path, whose congestion is predicted, so as to assure an output bandwidth of a cell whose loss is predicted, decreases a bandwidth of a virtual path having a smaller number of input cells per unit time on the basis of the obtained cell loss rate, and increases a bandwidth of the virtual path whose congestion is predicted.

10. A system according to claim 1, wherein the communication quality comprises a first communication quality in which a prevention of cell delay takes priority over a prevention of cell loss and a second communication quality in which the prevention of cell loss takes priority over the prevention of cell delay, and wherein said attribute assigning means assigns the attribute classifications to the virtual path groups in accordance with the first and second communication qualities.

* * * * *